UNITED STATES PATENT OFFICE.

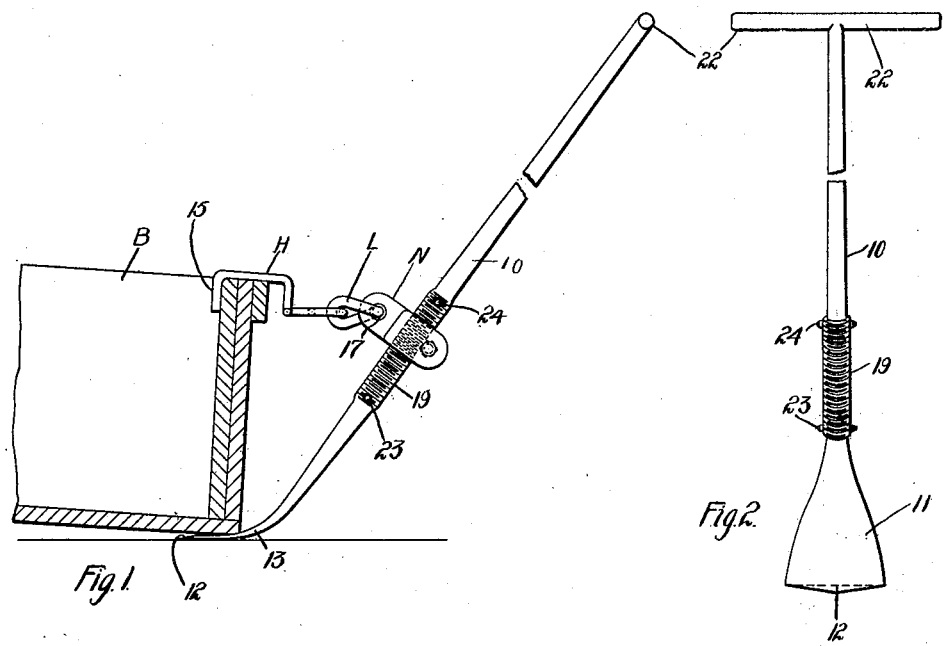

JOHN C. CHURLEY, OF RANKIN, PENNSYLVANIA.

SKID.

1,374,550.          Specification of Letters Patent.        Patented Apr. 12, 1921.

Application filed May 18, 1918. Serial No. 235,415.

*To all whom it may concern:*

Be it known that I, JOHN C. CHURLEY, a citizen of the United States, and a resident of Rankin, in the county of Allegheny and State of Pennsylvania, have invented a new and useful Improvement in Skids, of which the following is a specification.

This invention relates to portable skids for sliding or skidding heavy loads, such as heavily loaded boxes, about over the floors of factories, warehouses, etc.

Boxes and other containers receiving machine-made articles and too heavy for movement by one man, are often placed in position under the machine where it is difficult for two or more men to grip the loaded boxes to move the same.

The principal object of this invention is to provide a simple skid that may be manipulated by one man and readily connected to a heavily-loaded, inaccessible box or other heavy article.

The above and other objects and the novel features of the invention will be apparent from the following description taken in connection with the drawing, in which Figure 1 is a side elevation of a skid embodying my invention, showing the same in use; Fig. 2 is a front view of the shank of the skid; Figs. 3 and 4 are, respectively, plan and perspective views of the hook forming a part of the skid, and Fig. 5 is a plan view of the adjustable nut mounted on the shank.

Referring to the drawing, the skid comprises a shank 10 in the form of a steel rod, the lower end of which is flattened or broadened out as at 11 in Fig. 2. The lower end of the shank tapers to a point as at 12, Fig. 1, so that the same may be readily inserted under the edge of a heavy article, such as a loaded box B. The broad tapering lower end of the shank is also bent as at 13. The broad curved end thus provided has a smooth under-surface serving as a sliding or skidding surface for the skid and the curvature of the bent end is such that the same may serve as a fulcrum when the shank is swung to raise the opposite end of the box from the floor.

In order that the box may be swung to throw all of the weight thereof on the tapering lower end of the shank, I provide a hook H, the prongs of which may extend over the upper edge of an open-top box or container. The hook is shown in Figs. 3 and 4 and is formed of a single rod bent so as to provide the two spaced parallel prongs 14 and 15 and an intermediate eye 16, which latter is disposed outside of the box when the skid is connected thereto. The hook H is adjustably and flexibly connected to the shank 10 by a twisted link L that passes through the eye 16 of the hook and also through an eye 17 of an adjustable nut N. The nut N has a screw-threaded portion 18 fitting a similarly threaded portion 19 of the shank 10, and is split, as at 20, to permit a quick adjustment, the bolt 21 clamping the split side of the nut to secure the nut in any adjusted position. The upper end of the shank 10 is provided with a cross-arm 22 which constitutes the handle of the skid. Stop pins 23 and 24 may be provided at the respective ends of the screw threaded portion 19, or these devices may be omitted, if desired.

The operation of the device will be apparent from the drawing and the foregoing description. The device is used principally for moving and skidding open-top boxes filled with metal punchings, the filled boxes being frequently in inaccessible places under the punch press where two men are unable to grip the box to move it. In such cases, the tapering end of the skid is inserted under one edge of the box, which may usually be raised slightly, after which the hook H is slipped over the upper edge of the box. Then the shank 10 is forced downwardly, as a lever, about the curved part 13, as a fulcrum, to raise the other end of the box off the floor and throw practically all of the weight on the lower broad end of the skid. The under surface of the skid is smooth and, by pulling upon the handle 22, the skid carrying the heavily loaded box may be skidded over the floor.

Inasmuch as the hook-carrying nut has threaded engagement with the shank, it will be obvious that, even though it is not clamped in adjusted position, it cannot move along the shank during use of the skid so that the hook is, in fact, not only adjustable but also automatically locked in adjusted position.

While I have shown and described the skid in detail, it is to be understood that various features thereof may be modified without departing from the spirit of the invention or the scope of the appended claim.

I claim as my invention:

A receptacle-tilting-and-moving device comprising a bar having one end provided with a handle and its other end laterally curved and expanded to form a blade having a thin convex edge, a block clamped upon said bar intermediate its ends and adjustable thereon, a receptacle-engaging hook, and a link interposed between said block and said hook and loosely connected to each of said members.

In testimony whereof I have hereunto subscribed my name this 10th day of May, 1918.

JOHN C. CHURLEY.